US006171051B1

(12) United States Patent
Hamers et al.

(10) Patent No.: US 6,171,051 B1
(45) Date of Patent: Jan. 9, 2001

(54) APPARATUS AND METHOD FOR SEPARATING A STACK OF DOCUMENTS INTO INDIVIDUAL DOCUMENTS

(75) Inventors: Ludovicus Wilhelmus Alphonsus Hamers, Westzaan; Martijn Buyze, Amersfoort, both of (NL)

(73) Assignee: Buhrs-Zaandam B.V., Zaandam (NL)

( * ) Notice: Under 35 U.S.C. 154(b), the term of this patent shall be extended for 0 days.

(21) Appl. No.: 09/081,775

(22) Filed: May 20, 1998

(30) Foreign Application Priority Data

May 23, 1997 (NL) ........................................ 1006121

(51) Int. Cl.[7] .............................. B65H 59/06; B65G 3/00

(52) U.S. Cl. ................... 414/797.6; 198/444; 198/689.1; 198/575

(58) Field of Search ................................ 198/444, 461.3, 198/689.1, 575; 414/797.6, 797.8, 797.4

(56) References Cited

U.S. PATENT DOCUMENTS

| | | | | |
|---|---|---|---|---|
| 2,888,129 | * | 5/1959 | Chapman | 198/575 |
| 3,706,370 | * | 12/1972 | Bonafino et al. | 198/575 |
| 3,772,971 | * | 11/1973 | Dutro et al. | 271/88 X |
| 3,817,368 | * | 6/1974 | Wentz et al. | 198/575 |
| 3,871,511 | * | 3/1975 | Wentz et al. | 198/575 |
| 4,042,981 | | 8/1977 | Duncan et al. . | |
| 4,564,189 | * | 1/1986 | Noll | 414/91 X |
| 4,610,886 | * | 9/1986 | Buller-Colthurst | 198/575 |
| 5,026,249 | * | 6/1991 | Shill | 198/689.1 |
| 5,147,169 | * | 9/1992 | Miller et al. | 414/403 |

FOREIGN PATENT DOCUMENTS

| | | |
|---|---|---|
| 36 04 806 | 8/1987 | (DE) . |
| 0 478 981 | 4/1992 | (EP) . |

* cited by examiner

*Primary Examiner*—Christopher P. Ellis
*Assistant Examiner*—Joe Dillon, Jr.
(74) *Attorney, Agent, or Firm*—Birch, Stewasrt, Kolasch & Birch, LLP

(57) ABSTRACT

An apparatus for separating a stack of documents, such as, for instance, a stack of magazines, into individual documents. The apparatus has a number of endless conveyors which are arranged behind each other, connect to each other, and together form a transport path. The transport path has a first path section and a second path section. In the first path section, the stack of documents is formed into a shuffled document stream, and in the second path section, the documents are separated from the shuffled document stream into individual documents. The invention further provides a method for separating a stack of documents, such as, for instance, a stack of magazines, into individual documents.

11 Claims, 1 Drawing Sheet

APPARATUS AND METHOD FOR SEPARATING A STACK OF DOCUMENTS INTO INDIVIDUAL DOCUMENTS

BACKGROUND OF THE INVENTION

This invention relates to an apparatus for separating a stack of documents, such as, for instance, a stack of magazines, into individual documents.

In practice, there is a regular need to unstack stacks of documents, such as, for instance, magazines, so that individual documents are obtained. In the following, a document is understood to mean not only a magazine, but also a book, a video cassette, a compact disk, a postal item or a like information-carrying object. In the case of magazines, for instance, it is customary for the retailer to return to the publisher the magazines that have not been sold by the end of the day, week or month for which they are intended. Needless to say, the retailer does not first sort the magazines, but returns them to the publisher in often random stacks. Depending on the number of returned magazines and the price of the various magazines which have been returned, the publisher settles with the retailer. It is therefore essential that it be determined how many magazines of each type have been returned by the retailer. Determining these numbers manually is an impracticable task. Specifically, unstacking a random stack of magazines of different types presents a major problem. The object of the invention is to provide an apparatus and a method for separating a stack of documents into individual documents.

EP-A-0 478 981 discloses a method and an apparatus for separating a stack of documents. The known apparatus comprises a horizontal endless conveyor and an inclined roller conveyor. The rollers of the inclined roller conveyor are individually drivable, so that the mutual distance between the documents to be separated is controllable. Apart from the fact that the known apparatus is rather costly, the chances that a proper separation occurs are not particularly high. A first drawback of the known apparatus is that it works exclusively on the basis of the frictional force between the lowermost document resting on the rollers of the roller conveyor and the rollers. This frictional force is dependent on the mass of the document. Specifically with light documents, the frictional force will be small and the chances of the document not being carried along by the inclined roller conveyor are considerable. A second disadvantage of the known apparatus is that the angle of inclination of the roller conveyor in the known apparatus may not be too steep because otherwise the frictional force between the rollers and the underlying document will be too small. For the known apparatus, an angle of inclination of 20° is proposed. Such an inclination is rather gentle. The tendency of the overlying documents to slide down is therefore not all too strong. The known apparatus will therefore be unable to accomplish a proper separation in all types of documents. Moreover, the known apparatus can work only at a relatively low processing rate.

SUMMARY OF THE INVENTION

The apparatus contemplated by the invention should be applicable to all types of documents, that is, both very light and very heavy documents.

To that end, according to the invention, the apparatus for separating a stack of documents into individual documents comprises a number of endless conveyors which are arranged behind each other, connect to each other, and together form a transport path, the transport path comprising a first path section and a second path section, and in the first path section the stack of documents is formed into a shuffled document stream, and in the second path section the documents are separated from the shuffled document stream into individual documents, while at least one of the endless conveyors is inclined, and at least the or each inclined conveyor includes a vacuum chamber and an endless conveyor belt provided with suction openings, the vacuum chamber including a suction opening contiguous to the side of a top part of the conveyor belt remote from a transport surface. Owing to the apparatus comprising two path sections where, separately, two properly controllable operations occur, that is, forming a stack of documents into a shuffled document stream and subsequently separating the documents disposed in the shuffled document stream into individual documents, the separation of the documents can be realized in a controlled manner.

Owing to the inclined conveyors comprising a vacuum chamber and an endless conveyor belt provided with suction openings, excellent adherence between the conveyor belt and the underlying document is created during the transport on the inclined conveyors. As a consequence, a fairly steep angle of inclination for the inclined conveyors can be chosen, which promotes the degree of separation occurring on the inclined conveyors. What is further achieved through the vacuum chamber conveyors is that both very light documents and very heavy documents can be effectively separated. Because the inclined conveyors can have a fairly steep angle of inclination, the separation will occur very fast. The fact is the overlying documents will slide down fairly rapidly off the underlying document being sucked against the surface of the inclined conveyor belt. As a consequence of this fast separation, a travelling speed of about 2 meters per second can be achieved, which, in the case of A4 products, amounts to a capacity of about 4 products per second. Such a capacity is absolutely unattainable with the known apparatus.

In order to obtain a properly shuffled document stream, the apparatus is characterized, according to a further elaboration of the invention, in that the first path section comprises a first conveyor, arranged substantially horizontally as viewed in a direction of transport, and a second conveyor, which is inclined, so that, viewed in the direction of transport, it defines an ascending transport path section, a supply end of the second conveyor connecting to a discharge end of the first conveyor, while for forming the shuffled document stream the transport speed of the second conveyor is equal to or higher than the transport speed of the first conveyor.

In order to form a stream of individual documents from the shuffled document stream in a controlled manner, according to a further elaboration of the invention, the second path section includes a third conveyor, arranged substantially horizontally as viewed in the direction of transport, and the second path section further includes a fourth conveyor, which is inclined, so that, viewed in the direction of transport, it defines an ascending transport path section, a supply end of the fourth conveyor connecting to a discharge end of the third conveyor, while for separating the documents from the shuffled document stream the transport speed of the fourth conveyor is higher than the transport speed of the third conveyor.

Preferably, the two above-described preferred embodiments are combined with each other in that a supply end of the third conveyor connects to a discharge end of the second conveyor.

In order to arrive at a proper separation of the documents, according to a further elaboration of the invention, above at least some of the endless conveyors a sensor is arranged by means of which the passing documents are sensed, and the transport speed of at least some conveyors is controllable, the apparatus comprising a control which, depending on a document stream sensed by the sensors, controls the transport speed of the different conveyors.

Needless to say, the substantially horizontally arranged conveyors, too, can be provided with an endless conveyor belt and a vacuum chamber as indicated above.

With an apparatus of such design, documents of different dimensions and different thicknesses contained in a single stack can be efficiently separated from each other.

The invention further relates to a method for separating a stack of documents, such as, for instance, a stack of magazines, into individual documents. According to the invention, in a first method step the stack of documents is formed into a shuffled document stream, which document stream has a first, optionally variable, transport speed, while in a second method step a second transport speed, higher than the first transport speed, is imposed on the leading document of the shuffled document stream, so that this leading document is separated from the shuffled document stream and is discharged for further processing.

Further elaborations are described in the subclaims and will hereinafter be further clarified on the basis of an exemplary embodiment, with reference to the drawings.

DESCRIPTION OF PREFERRED EMBODIMENTS

Figure 2:
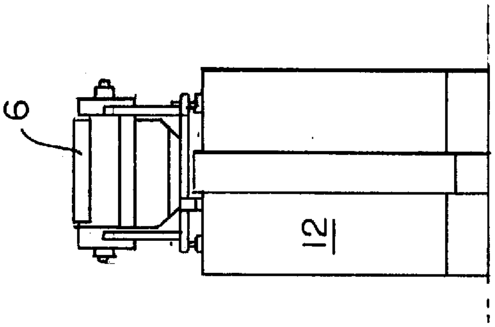
FIG. 2 shows a right-hand side view of the exemplary embodiment shown in FIG. 1.
Figure 1:
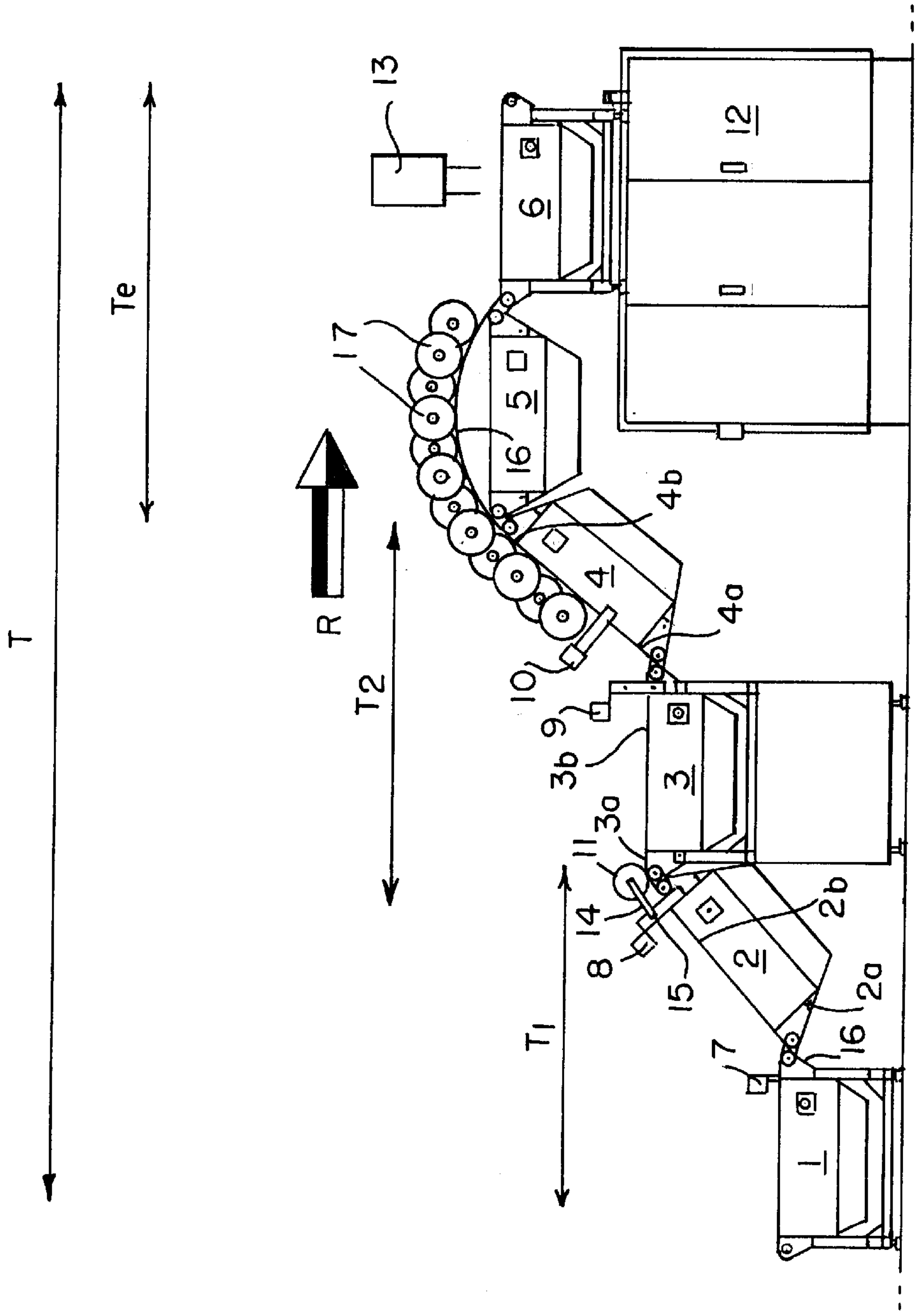
FIG. 1 shows a side elevation of an exemplary embodiment of an apparatus according to the invention.

The exemplary embodiment shown is intended for separating a stack of documents into individual documents and comprises six endless conveyors 1–6, which are arranged behind each other and connect to each other, together forming a transport path T. The transport path T comprises a first path section T1 and a second path section T2. In the first path section T1 a stack of documents which is supplied on the first conveyor 1 is formed into a shuffled document stream. In the second path section T2 the documents are separated from the shuffled document stream into individual documents. In the present exemplary embodiment, the first path section T1 comprises a first conveyor 1, arranged substantially horizontally as viewed in a direction of transport R, and a second conveyor 2, which is inclined, so that, viewed in the direction of transport R, it defines an ascending transport path section. A supply end 2*a* of the second conveyor connects to a discharge end of the first conveyor 1. For forming the shuffled document stream, the transport speed of the second conveyor 2 is equal to or higher than the transport speed of the first conveyor 1. The second path section T2 includes a third conveyor 3, arranged substantially horizontally as viewed in the direction of transport R, while the second path section T2 further includes a fourth conveyor 4, which is inclined, so that, viewed in the direction of transport, it defines an ascending transport path section. A supply end 4*a* of the fourth conveyor connects to a discharge end 3*b* of the third conveyor 3. For separating the documents from the shuffled document stream, the transport speed of the fourth conveyor 4 is higher than the transport speed of the third conveyor 3. The supply end 3*a* of the third conveyor 3 connects to the discharge end 2*b* of the second conveyor 2. In order to prevent disturbance of the shuffled document stream in the transfer from the second conveyor 2 to the third conveyor 3, the transport speed of the third conveyor 3 always corresponds substantially to the transport speed of the second conveyor 2. The present exemplary embodiment includes four sensors 7–10 arranged above the first, the second, the third and the fourth conveyor 1–4, respectively. Further, at the downstream end 2*b* of the second conveyor 2, a height detector 11 is arranged, which is arranged to detect the height of the passing document stream. In the present exemplary embodiment, the height detector 11 is designed as a rotatable wheel connected to a pivot 15 via a rod 14. The pivot 15 is connected to a potentiometer. The apparatus further includes a control 12 which, depending on a document stream sensed by the sensors 7–10, controls the transport speed of the different conveyors 1–6. Obviously, the potentiometer of the height detector 11 is also connected to this control 12. The sensors 7–10 can be designed, for instance, as optical sensors or other sensors known per se.

Using the control 12, the speed of the second conveyor 2 is controlled, depending on the height of the shuffled document stream as detected by the height detector 11. It is noted that the speed of the second conveyor 2 also depends on the document stream sensed by the other sensors 7–10. The control 12 is further arranged to control the speed of the third conveyor 3 depending on the separation between the successive documents as sensed by the fourth sensor 10.

In order to prevent downward sliding of the documents on the slanting paths formed by the second conveyor 2 and the fourth conveyor 4, in the present exemplary embodiment in any case the inclined conveyors 2, 4 are provided with a vacuum chamber and with an endless conveyor belt provided with suction openings, while the vacuum chamber is provided with a suction opening contiguous to the side of a top part of the conveyor belt remote from a transport surface. Through the presence of this vacuum chamber, the products are sucked against the surface of the inclined conveyor belt. If an appropriate surface roughness of the conveyor belts is selected, shifting of the products relative to the slanting conveyor belts will be prevented. Only a shift of the products relative to each other is then a possibility, which is precisely what is intended, to enable mutual separation of the products. The inclined arrangement of the conveyors 2 and 4 contributes to a considerable extent to the contemplated separation of the products.

In some cases, it is of particular advantage when at least one of the conveyors 1–4 is slightly inclined in a direction perpendicular to the direction of transport, so that the documents disposed thereon all slide to one longitudinal side of the conveyor in question.

In the present exemplary embodiment, which is specifically intended for separating documents and subsequently sensing the separated documents, there connects to the discharge end 4*b* of the fourth conveyor 4 a fifth conveyor 5 which constitutes the transition from the inclined transport path section of the fourth conveyor 4 to a horizontal transport path end section Te. For the purpose of forming a gradual transition from the inclined transport path section of the fourth conveyor 4 to a horizontal transport path section which is defined by a sixth conveyor 6, the fifth conveyor 5 has a bent transport surface 16. Above the bent transport surface of the fifth conveyor 5 and the end portion 4*b* of the fourth conveyor 4, foam rubber wheels 17 may optionally be arranged, preventing the products, which can sometimes have a considerable transport speed, from coming off at the transition from the slanting part to the horizontal part of the conveyor belt. In the present exemplary embodiment, above the horizontal transport path end section formed by the sixth conveyor 6, a camera 13 is arranged for identifying the documents. Using the camera 13, the individual documents can be identified independently of the position they are in, so that in a computer or like processing unit a record can be kept of how many magazines of what type are contained in a stack.

The operation of the apparatus is as follows:

A stack of documents is placed on the first conveyor 1. As soon as the first sensor 7 detects the stack, the transport speed of the first conveyor 1 is reduced and the magazines at the bottom of the stack are transported in upward direction by the second conveyor 2, so that the stack will generally topple backwards and on the second conveyor 2 a shuffled document stream will form. This shuffled document stream is formed partly as a result of the fact that the second conveyor 2 is inclined. Next, the shuffled document stream is transported further to the third conveyor 3, whereafter the fourth conveyor 4, which has a higher speed than the third conveyor 3, successively pulls away the leading document of the shuffled document stream on the third conveyor 3 so as to form a stream of individual, mutually separate documents. The individual documents are then transported further via the fifth conveyor 5 to the sixth conveyor 6, where the camera 13 records what type of document is passing. Depending on the presence and/or absence of documents as detected by the sensors 7–10, the speeds of the different conveyors 1–6 are controlled. The speed is further influenced by the height, sensed by the height detector 11, of the shuffled document stream at the supply end 3*a* of the third conveyor 3.

It will be clear that the invention is not limited to the exemplary embodiment described, but that various modifications are possible within the scope of the invention. Thus, the first path section T1 could be designed as two or more substantially horizontally arranged conveyors which, viewed in the direction of transport, successively have a higher transport speed. With such an assembly of conveyors, too, a stack can be formed into a shuffled document stream. Essential is that the stack of documents is first formed into a shuffled document stream, whereafter the individual documents are separated from the shuffled document stream.

What is claimed is:

1. An apparatus for separating individual documents from a stack of the documents, comprising:

a plurality of endless conveyors arranged one behind the other and connected to each other so as to form a transport path (t), said transport path (t) having a first path (T1) followed by a second path (T2);

said first path (T1) having an inclined conveyor such that first documents of the stack next to the conveyor are held thereto by a vacuum chamber and other documents of the stack slide downwardly on the inclined conveyor so as to shuffle the documents from the stack and form a shuffled document stream;

said second path (T2) having a conveyor with a transport speed which is substantially greater than a transport feed of a preceding conveyor such that documents of the shuffled document stream are separated into individual documents;

a sensor disposed above at least some of the conveyors for detecting documents passing thereunder;

a control for controlling the transport speed of at least some of the conveyors in response to the sensor; and wherein said a vacuum chamber and an endless conveyor belt provided with suction openings, the vacuum chamber including a suction opening contiguous to the sides of a top part of the conveyor belt remote from a transport surface of the top part of the conveyor belt.

2. An apparatus according to claim 4, wherein at least one of the conveyors (1–4) is slightly inclined in a direction perpendicular to the direction of transport, so that the documents disposed thereon all slide to a longitudinal side of the conveyor (1–4).

3. An apparatus according to claim 1, wherein at least four sensors (7–10) are arranged above a first, a second, a third and a fourth conveyor (1–4), respectively.

4. An apparatus according to claim 3, wherein at a downstream end (2*b*) of the second conveyor (2) a height detector (11) is arranged, which is adapted to detect the height of the passing document stream, the height detector (11) being connected to the control (12) which is arranged to control the speed of the second conveyor (2), depending on the height of the shuffled document stream as detected by the height detector (11).

5. An apparatus according to claim 3, wherein the control (12) is arranged to control the speed of the third conveyor (3), depending on the separation between the successive documents sensed by the fourth sensor (10).

6. An apparatus according to claim 14, wherein the first path section (T1) has a first conveyor (1), arranged substantially horizontally as viewed in a direction of transport (R), and a second inclined conveyor (2), which is inclined such that, viewed in the direction of transport (R), the first path (T1) defines an ascending transport path section, and a supply end (2*a*) of the second inclined conveyor (2) connects to a discharge end of the first conveyor (1), and a transport speed of the second inclined conveyor (2) is equal to or higher than a transport speed of the first conveyor (1).

7. An apparatus according to claim 2, wherein the second path section (T2) includes a third conveyor (3), arranged substantially horizontally as viewed in the direction of transport, and the second path section (T2) further includes a fourth conveyor (4), which is inclined such that, viewed in the direction of transport (R), the second path (T2) defines an ascending transport path section, and a supply end (4*a*) of the fourth inclined conveyor (4) connecting to a discharge end (3*b*) of the third conveyor (3), and a transport speed of the fourth inclined conveyor (4) is higher than a transport speed of the third conveyor (3).

8. An apparatus according to claim 7, wherein a supply end (2*a*) of the third conveyor (3) connects to a discharge end (2*b*) of the second conveyor (2).

9. An apparatus according to claim 8, wherein the transport speed of the third conveyor (3) substantially corresponds to the transport speed of the second conveyor (2).

10. An apparatus according to claim 8, wherein connected to the discharge end (4*b*) of the fourth conveyor (4) there is a fifth conveyor (5) which constitutes a transition from an inclined transport path section of the fourth conveyor (4) to a horizontal transport path end section (Te).

11. An apparatus according to claim 10, wherein above a transport path end section (Te) a camera (13) is arranged for identifying the documents.

* * * * *